United States Patent
Signorino et al.

(10) Patent No.: US 11,982,036 B2
(45) Date of Patent: May 14, 2024

(54) LIGHT SENSOR DEVICE AND DOMESTIC ELECTRICAL APPLIANCE EQUIPPED THEREWITH

(71) Applicant: emz-Hanauer GmbH & Co. KGaA, Nabburg (DE)

(72) Inventors: Manfredi Signorino, Wackersdorf (DE); Martin Brabec, Nabburg (DE); Lukas Schade, Nabburg (DE); Georg Spießl, Altendorf (DE)

(73) Assignee: EMZ-HANAUER GMBH & CO. KGAA, Nabburg (DE)

( * ) Notice: Subject to any disclaimer, the term of this patent is extended or adjusted under 35 U.S.C. 154(b) by 0 days.

(21) Appl. No.: 17/737,763

(22) Filed: May 5, 2022

(65) Prior Publication Data
US 2022/0356627 A1 Nov. 10, 2022

(30) Foreign Application Priority Data
May 5, 2021 (DE) .......................... 102021111687.2

(51) Int. Cl.
*D06F 34/30* (2020.01)
*D06F 34/20* (2020.01)
*G01S 17/04* (2020.01)

(52) U.S. Cl.
CPC .............. *D06F 34/30* (2020.02); *D06F 34/20* (2020.02); *G01S 17/04* (2020.01)

(58) Field of Classification Search
CPC ........... D06F 34/30; D06F 34/20; G01S 17/04
See application file for complete search history.

(56) References Cited

U.S. PATENT DOCUMENTS

| 2014/0127967 A1* | 5/2014 | Liao ..................... G02B 5/0236 252/582 |
| 2017/0023232 A1* | 1/2017 | Signorino ........... F21V 33/0044 |
| 2020/0110159 A1* | 4/2020 | Wohlgenannt .......... G01S 17/42 |

FOREIGN PATENT DOCUMENTS

| DE | 19837248 A1 | 2/2000 |
| DE | 102018008895 A1 | 10/2019 |
| DE | 102020209194 A1 | 1/2022 |
| JP | S61723 A * | 1/1986 |
| WO | 2014160908 A2 | 10/2014 |

\* cited by examiner

*Primary Examiner* — Jamil Ahmed
(74) *Attorney, Agent, or Firm* — Hayes Soloway PC

(57) ABSTRACT

A light sensor device is disclosed for installation in a heat-using domestic electrical appliance such as, for example, a washing machine or a dishwasher and permits the implementation of a touch-free operating function, for example an automatic door opening function. The light sensor device includes in some embodiments: a window element which is formed of light-permeable material and is arranged with space on a first window side for hand movements; a first light source arrangement arranged to radiate visible light into the window element; a second light source arrangement which is arranged to radiate infrared light through the window element from a second window side opposite the first window side; and a photodetector arrangement which is sensitive to infrared light of the second light source arrangement and is arranged on the second window side, for detecting infrared light which strikes the photodetector arrangement from the window element.

11 Claims, 9 Drawing Sheets

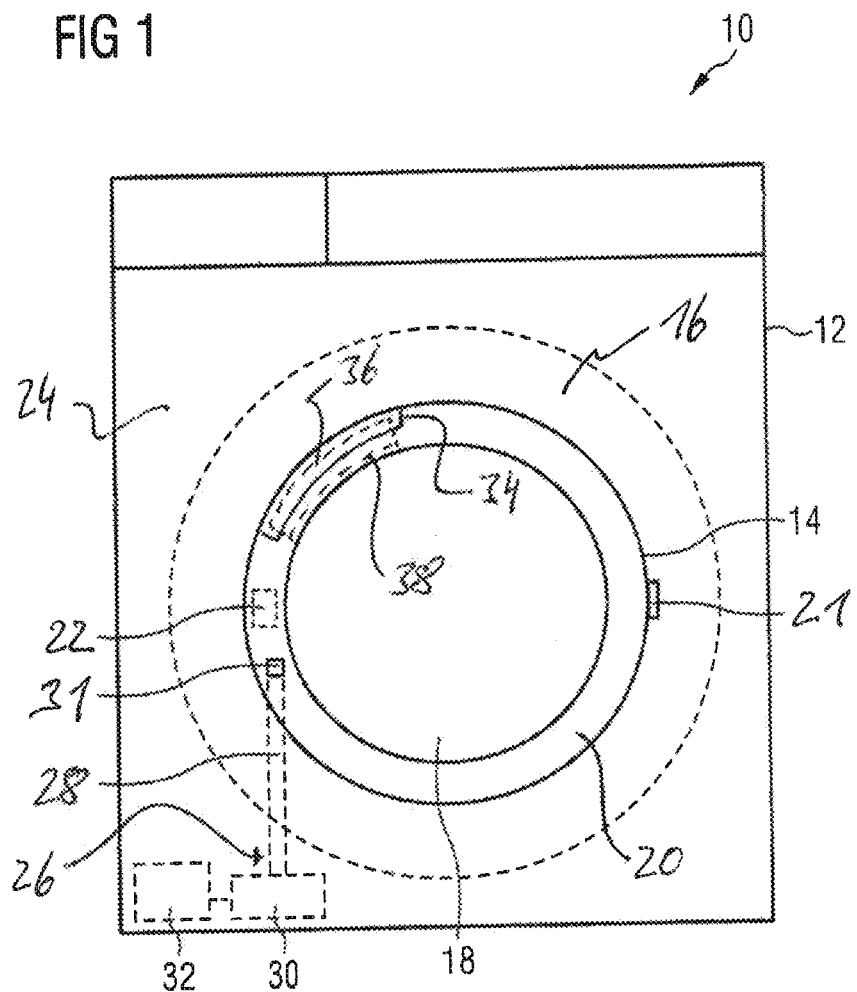

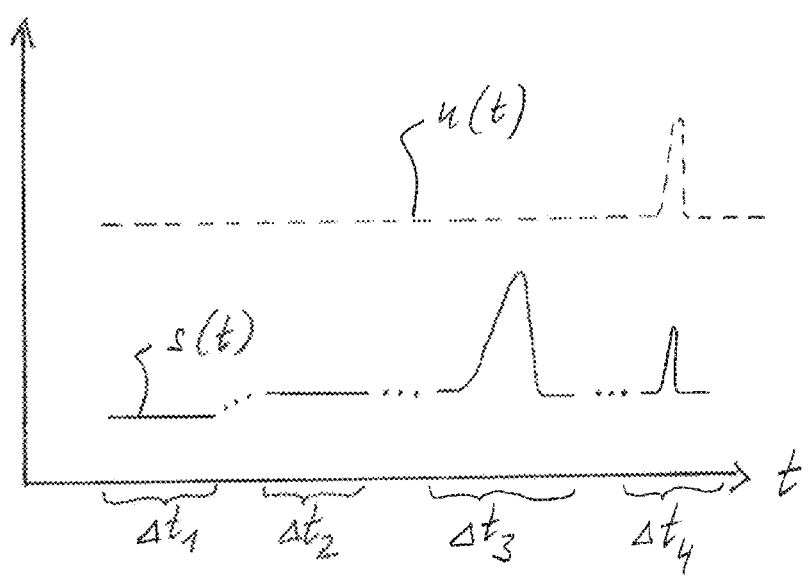

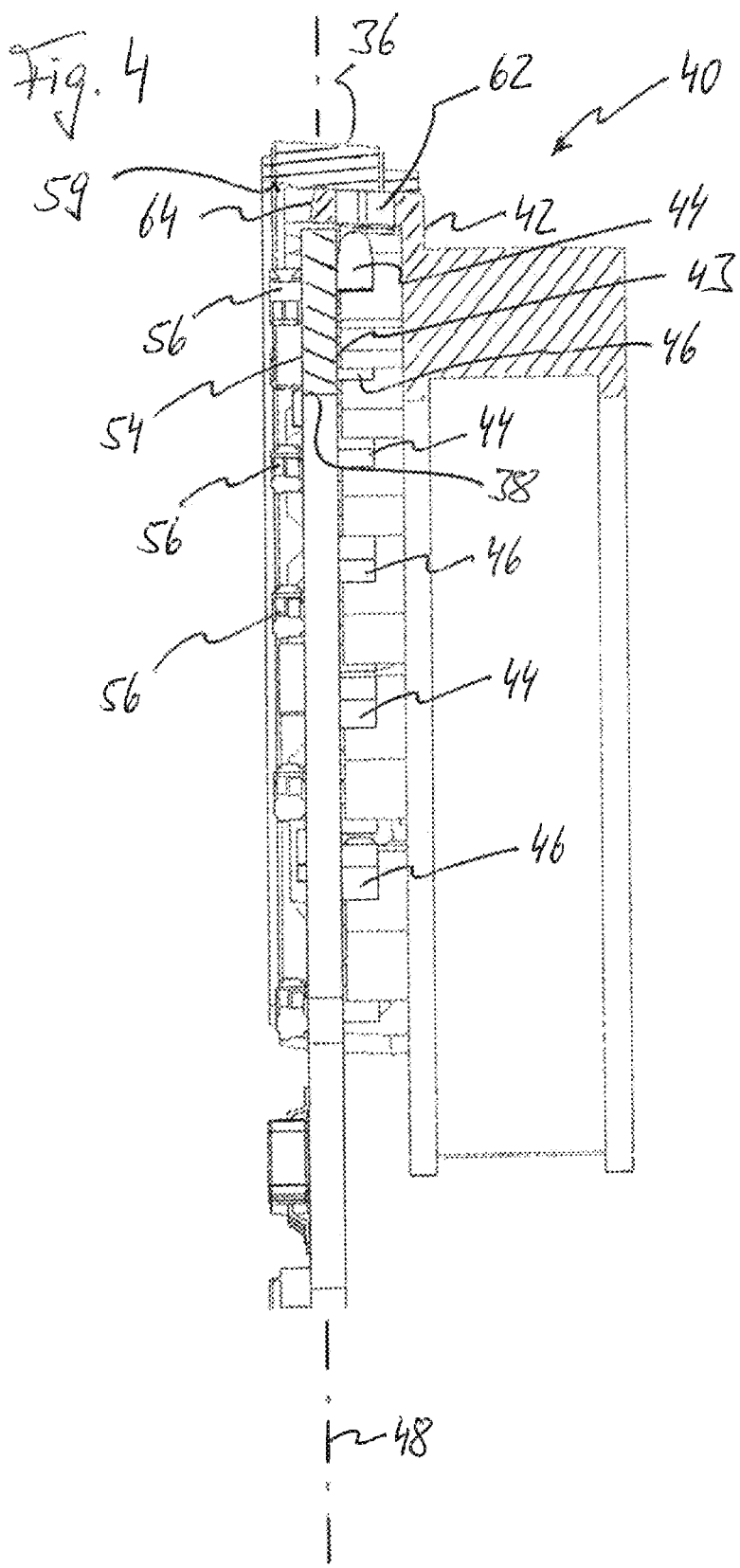

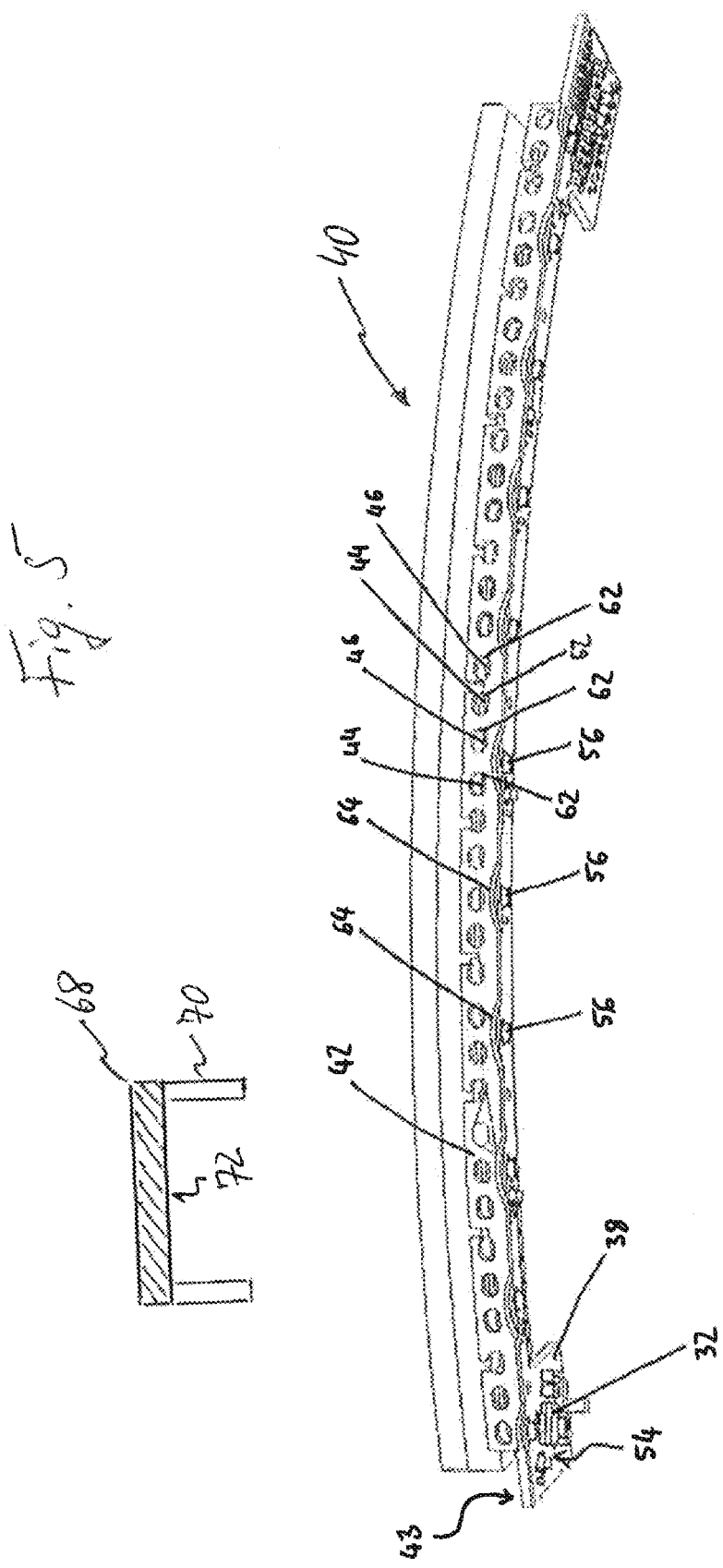

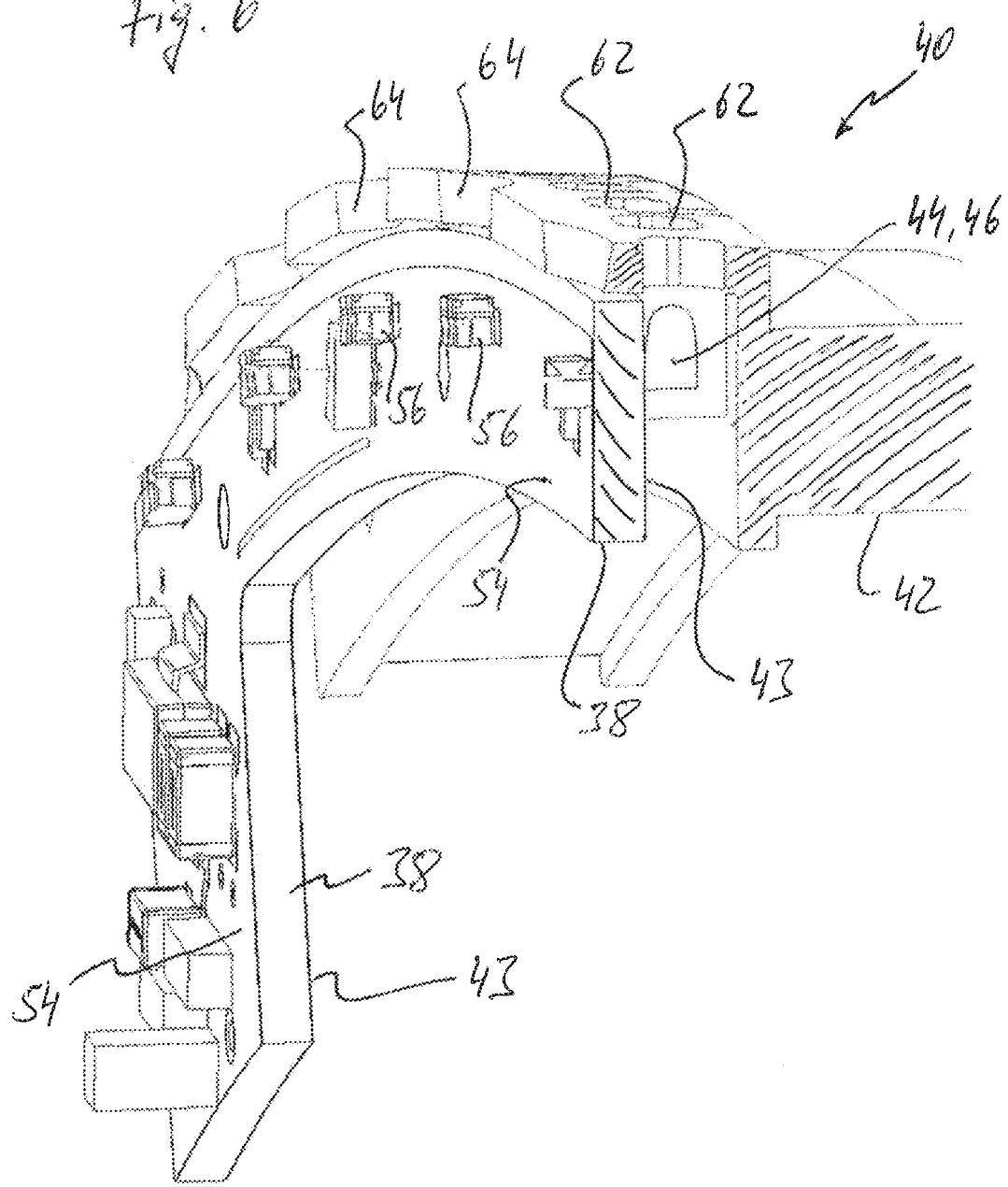

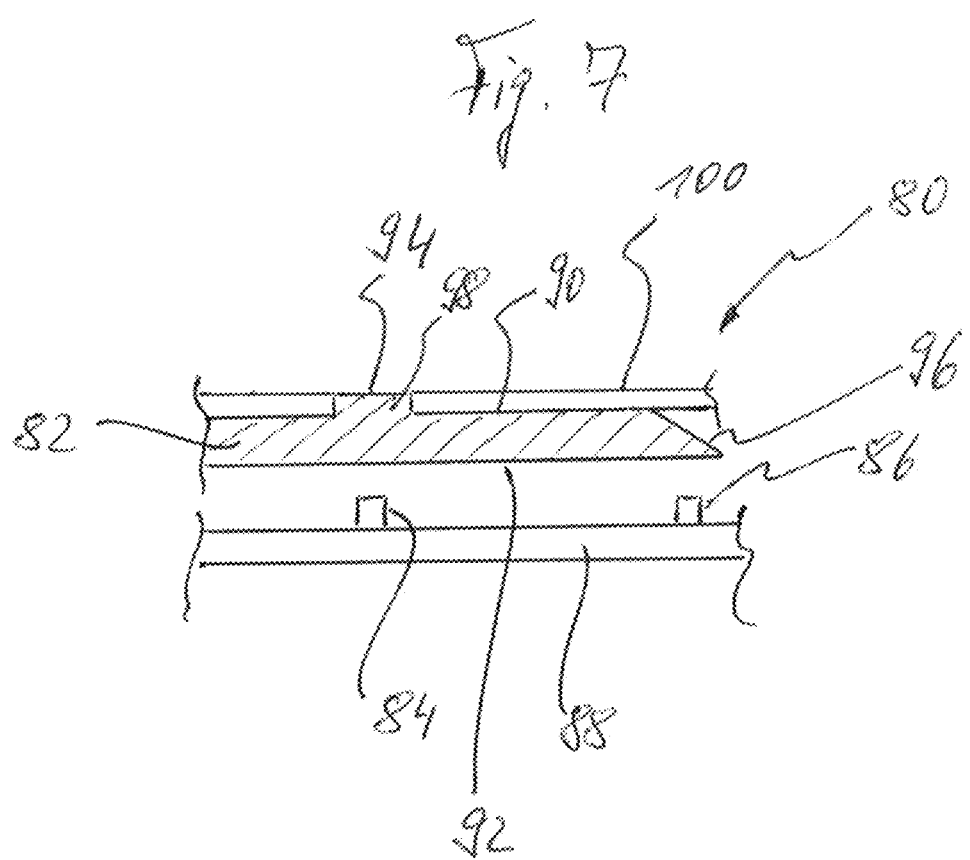

LIGHT SENSOR DEVICE AND DOMESTIC ELECTRICAL APPLIANCE EQUIPPED THEREWITH

CROSS-REFERENCE TO RELATED APPLICATIONS

This application claims priority to German Patent Application 10 2021 111 687.2, filed on May 5, 2021, the contents of which are incorporated by reference herein.

TECHNICAL FIELD

The present disclosure relates to a light sensor device and to a heat-using domestic appliance equipped with such a light sensor device.

BACKGROUND

Domestic electrical appliances such as, for example, washing machines, dishwashers, tumble dryers, baking ovens or the like have operating elements the actuation of which allows a user to activate various functions of the domestic appliance. In conventional domestic appliances, the operating elements need to be physically touched by the user, as is the case with push-buttons or dials, for example. Techniques for the touch-free recognition of an operating gesture of a user have the advantage that they avoid signs of usage on the operating elements caused by physical contact. Such signs of usage can not only impair the esthetic impression but can also impair the functionality of the operating elements.

SUMMARY

It is an object at least of embodiments of the invention to show measures which, in a domestic electrical appliance, allow an operating function that works reliably to be implemented in an esthetically pleasing manner.

According to some embodiments, there is provided according to the invention, for achieving this object, a light sensor device which is provided in particular for use in a domestic electrical appliance and comprises: a window element which is formed of light-permeable material and is arranged with space on a first window side for hand movements; a first light source arrangement arranged to radiate visible light into the window element; a second light source arrangement which is arranged to radiate infrared light through the window element from a second window side opposite the first window side; a photodetector arrangement which is sensitive to infrared light of the second light source arrangement and is arranged on the second window side, for detecting infrared light which strikes the photodetector arrangement from the window element.

In the light sensor device according to the invention, the photodetector arrangement detects diffusely reflected light which is reflected by an object to be sensed which is situated within the detection range of the light sensor device in an area formed on the first window side of the window element (so-called sensing area). When an object to be sensed is present in the sensing area, the diffusely reflected radiation intensity which reaches the photodetector arrangement is greater than when an object to be sensed is absent. An increased intensity of the radiation received by the photodetector arrangement is therefore an indication of the presence of an object to be sensed in the sensing area. Even without the presence of an object to be sensed in the sensing area, radiation emitted by the second light source arrangement can be diffusely reflected to the photodetector arrangement. The reason for such diffuse reflection of radiation can be in particular the window element, which is able to scatter part of the IR radiation emitted by the second light source arrangement and reflect it to the photodetector arrangement without these radiation components passing through the window element into the sensing area. However, because a certain portion of the IR radiation emitted by the second light source arrangement is in any case transmitted through the window element and reaches the sensing area, the conditions are created that, when an object to be sensed is present in the sensing area, IR radiation can be reflected at the object to be sensed and diffusely reflected through the window element to the photodetector arrangement. The presence of an object to be sensed in the sensing area accordingly effects an increase in the IR radiation intensity detected by the photodetector arrangement.

The first light source arrangement emits visible light, which is radiated into the window element. If the window element has an opaque or other scattering form, the window element can appear to a user as a luminous operating panel in the vicinity of which he must move his hand or a finger in order to activate an operating function. In the light sensor device according to the invention, the window element is accordingly struck by the light of two different radiation source arrangements, on the one hand by the visible light of the first light source arrangement and on the other hand by the infrared light of the second light source arrangement.

In some embodiments, the IR radiation emitted by the second light source arrangement has a maximum intensity in a range between about 830 nm and about 870 nm (e.g. about 850 nm) or in a range between about 920 nm and about 960 nm (e.g. about 940 nm).

In some embodiments, the first light source arrangement and the second light source arrangement are mounted (or formed) on opposite board sides of a common circuit board which is arranged with its board plane transverse, in particular perpendicular, to a main plane of extent of the window element. Such an arrangement of the circuit board relative to the window element makes it possible to mount both light source arrangements and, if desired, also the photodetector arrangement on a common circuit board. This reduces the construction and manufacturing outlay compared to solutions with a separate circuit board for each of the light source arrangements. Moreover, mounting of the two light source arrangements on opposite board sides of the circuit board can improve or simplify the mutual shielding of the light source arrangements, which can be advantageous in particular when the first light source arrangement also emits light components in the IR wavelength range. Interference of the first light source arrangement with the sensing function of the light sensor device can successfully be avoided in this way. It will be appreciated that mounting of the two light source arrangements on separate circuit boards or alternatively on the same board side of a common circuit board is in no way excluded within the scope of the present disclosure.

In some embodiments, the light sensor device comprises a circuit board arrangement with two circuit board faces which are substantially parallel to one another, overlap when their flat sides are seen from above, and are separated from one another by circuit board material, wherein the first light source arrangement is mounted (or formed) on a first of the circuit board faces and the second light source arrangement is mounted (or formed) on the second of the circuit board faces, wherein the window element projects beyond the two circuit board faces at the board edges and is configured with one or more deflecting structures for effecting a deflection of visible light emitted by the first light source arrangement into the parts of the window element projecting beyond the second circuit board face.

In some embodiments, the window element extends in an elongate manner in the form of a strip, for example in the manner of a curved strip, wherein the first and second light source arrangements each comprise a plurality of light source elements arranged distributed along the strip longitudinal direction of the window element. The light source elements can be implemented by LED technology, for example. Instead of a curved strip, the window element can also be in the form of a straight strip. The form of a curved strip is appropriate, for example, when the window element is to be arranged on an appliance door with a circular periphery, for example on the front door (bull's-eye door) of a front-loader washing machine. By contrast, the form of a straight strip is appropriate, for example, when the window element is to be arranged on a cuboidal appliance body of a domestic appliance or on an appliance door with a quadrangular contour.

According to some embodiments, the photodetector arrangement comprises a plurality of infrared detector elements arranged along the strip longitudinal direction of the window element in interleaved distribution with the light source elements of the second light source arrangement. For example, an even distribution of the light source elements of the second light source arrangement and the infrared detector elements is conceivable such that—when seen in the strip longitudinal direction of the window element—a light source element of the second light source arrangement and an infrared detector element follow one another alternately. A two-dimensional distribution and accordingly two-dimensional interleaving of the light source elements of the second light source arrangement and the infrared detector elements is likewise conceivable.

A further aspect of the present invention relates to a light sensor device which is provided in particular for a domestic electrical appliance and comprises: a circuit board arrangement with two circuit board faces which are substantially parallel to one another, overlap when their flat sides are seen from above, and are separated from one another by circuit board material; at least one infrared light source element arranged on a first of the circuit board faces and having a main radiation axis oriented substantially parallel or at a small acute angle to the first circuit board face; at least one infrared detector element arranged on the circuit board arrangement, in particular on the first circuit board face; and at least one visible light source element arranged on the second of the circuit board faces and having a main radiation axis oriented substantially parallel or at a small acute angle to the second circuit board face.

According to some embodiments, the light sensor device further comprises a diaphragm structure which projects beyond the circuit board arrangement outside the board edges thereof and which, in association at least with each infrared detector element and if desired also in association with each visible light source element or/and each infrared light source element, has a diaphragm contour for limiting the spatial detection range of the infrared light detector elements or the spatial emission range of the infrared light and visible light source elements.

In some embodiments, the first and second circuit board faces face away from one another. They are formed, for example, by the opposite board sides of a common circuit board. However, it is not impossible that the two circuit board faces are formed by separate circuit boards arranged spaced apart from and substantially parallel to one another.

Yet a further aspect of the present disclosure provides a light sensor device which is provided in particular for a domestic electrical appliance and comprises: a circuit board; a plurality of infrared light source elements arranged distributed on the circuit board, in particular distributed along a row, and each having a main radiation axis oriented substantially parallel or at a small acute angle to the board plane of the circuit board; a plurality of infrared detector elements arranged distributed on the circuit board, in particular distributed along the same row as the infrared light source elements, and each having a main detection axis oriented substantially parallel or at a small acute angle to the board plane of the circuit board; a diaphragm structure which projects beyond the circuit board outside the board edges thereof and which, in association at least with each of the infrared detector elements and if desired also in association with each of the infrared light source elements, has a diaphragm contour for limiting the spatial detection range of the infrared light detector elements or the spatial emission range of the infrared light source elements.

The diaphragm structure can comprise a common diaphragm body which is formed of IR-impermeable material and comprises diaphragm contours for each infrared detector element and if desired also for each infrared light source element or/and each visible light source element.

In some embodiments, the diaphragm body has a completely surrounded diaphragm opening in association with each infrared detector element and if desired also in association with each infrared light source element.

The present disclosure additionally provides a domestic electrical appliance, which comprises: an appliance body; a door, movably mounted on the appliance body, for closing a process chamber formed in the appliance body; an electrically controlled door mechanism at least for opening the closed door; a light sensor device for the reflection-based detection of the presence of an object to be sensed in a sensing area of the light sensor device, wherein the light sensor device comprises a plurality of light source elements arranged in a distributed manner and a plurality of photodetector elements arranged in a distributed manner and each capable of providing an electrical detection signal; a control device which, on the basis of the detection signal of at least one of the plurality of photodetector elements, is capable of recognizing the presence of an object to be sensed in the sensing area and, in dependence on the recognition of the presence of the object to be sensed, of controlling an actuation of the door mechanism. The door mechanism permits automated opening of the door without the user having to actively pull on the door for that purpose. It is sufficient for the user to move an object to be sensed, for example the finger of his hand, into the sensing area. The control device recognizes the presence of the hand, or the object to be sensed, by evaluating the detection signal of at least one of the photodetector elements and thereupon activates an electrically controllable actuator contained in the door mechanism. As a result of the activation of the actuator, the door mechanism opens the door slightly; further intervention by the user is not necessary for this purpose.

The domestic appliance is, for example, a washing machine, a dishwasher, a tumble dryer, a so-called washer-dryer (i.e. an appliance with a combined function for washing and drying laundry), a baking oven or the like. The process chamber is a chamber in which a working process of the domestic appliance takes place, for example a cleaning process or/and a drying process or a cooking process. In some embodiments, the light source elements are in the form of infrared light source elements; in this case, the photodetector elements are in the form of infrared detector elements, the sensitivity range of which overlaps with the emission wavelength, or the emission wavelength range, of the IR source elements.

In some embodiments, the light source elements are arranged distributed, in particular evenly distributed, in a row, wherein in each case at least one photodetector element and in particular not more than one photodetector element is arranged between two adjacent light source elements.

In some embodiments, the light source elements are distributed over a length of the row of at least 10 cm or at least 15 cm or at least 20 cm. The light source elements can be distributed in the row with a line density of, for example, not more than one light source element per 2.0 cm or not more than one light source element per 1.5 cm or not more than one light source element per 1.1 cm or not more than one light source element per 0.8 cm.

In some embodiments, the light source elements are arranged in a straight or an arcuately curved row. When the domestic appliance is in the form of a front-loader washing machine, the light source elements and the photodetector elements can be arranged distributed on the door along a door circumference arc, for example.

A further aspect of the present disclosure provides a heat-using domestic electrical appliance which comprises: an electrically controlled actuator; a light sensor device for the reflection-based detection of the presence of an object to be sensed in a sensing area of the light sensor device, wherein the light sensor device comprises at least one light source element and at least one photodetector element; a control device which is adapted, at least in dependence on a specified condition relating to the behavior over time of a detection signal provided by the photodetector element or/and of a measurement signal derived therefrom and specific for the photodetector element, to recognize the presence of an object to be sensed in the sensing area and, in dependence on the recognition of the presence of the object to be sensed, to control an actuation of the actuator.

Washing machines, dishwashers, tumble dryers and baking ovens are examples of domestic appliances in which heat is used at least to assist a working process. In a washing machine, for example, the washing liquor is heated up to about 90° C., while in dishwashers it is conventional to heat the dishwashing liquor at least in some cleaning programs to about 70° C. Tumble dryers also require heat for efficient drying of the laundry; in baking ovens, it is evident that heat is used for the cooking process.

The use of heat can mean that the light source element or/and the photodetector element of the light sensor device is exposed to fluctuating temperature conditions. Optoelectronic components such as, for example, phototransistors are, however, often subject to a relevant temperature dependence of their optoelectronic properties. Depending on the installation position of the light sensor device, the useful heat, or process heat, of the domestic appliance can lead to the optoelectronic components of the light sensor device heating up considerably during an operating cycle of the domestic appliance and, even after the end of the operating cycle, requiring a considerable time of, for example, at least several minutes to cool down to room temperature again. Thus, it can easily be, for example, that, when the light sensor device is installed in the bull's-eye door of a front-loader washing machine, the optoelectronic components of the light sensor device heat up to more than about 50 degrees Celsius during a 90-degree washing program. On completion of the washing program, it can then easily take up to half an hour or even longer for the optoelectronic components to cool down close to room temperature again. Such fluctuations in the operating temperature of the optoelectronic components can lead to signal changes of the detection signal provided by the photodetector element without these signal changes being attributable to the movement of an object to be sensed into the sensing area of the light sensor device.

However, the invention makes use of the finding that signal changes that are attributable to the movement of an object to be sensed into the sensing area generally occur more quickly in terms of time than signal changes that are attributable to temperature fluctuations resulting from the use of heat by the domestic appliance. Thus it can be assumed, for example, that, in a washing machine or dishwasher, it can take several minutes or even longer for heating of the washing liquor or dishwashing liquor to have an impact on the operating temperature of the optoelectronic components of the light sensor device. By contrast, it can be assumed that signal changes are to be observed in the detection signal within fractions of a second when a user moves his hand into the sensing area of the light sensor device. Accordingly, temperature-related signal changes of the detection signal can be ruled out by analyzing the change over time of the detection signal and taking into account only comparatively rapid signal changes over time, while comparatively slow signal changes are disregarded.

In order to compensate for comparatively slow signal changes, a moving average of the detection signal, or a detector-specific measurement signal derived therefrom, can be determined. There can be used for the averaging, for example, a group of recent or most recent signal values (sample values) of the detection signal or of the measurement signal which, in terms of their signal magnitude, lie within a specified, comparatively narrow bandwidth and, owing to this relative similarity, offer the assurance that none of the signal values has been affected by the presence of an object to be sensed in the sensing area. The specified bandwidth can be defined absolutely or relatively; for example, it can be specified that only signal values that differ from one another by not more than a specified factor may be used for updating the average.

By repeatedly updating the average on the basis of a current group of signal values, a signal drift, which is attributable, for example, to fluctuations in the ambient temperature of the light sensor device, can be taken into account. Accordingly, a temperature sensor is not required for detecting the current temperature conditions of the light sensor device by means of sensors. However, it is in principle not impossible within the scope of the present disclosure to equip the light sensor device with a temperature sensor in order to carry out measurements of the current operating temperature of the light sensor device and, on the basis of the measured temperature, for example by referring to stored, previously determined tabular values, to compensate for temperature-related effects on the signal magnitude of the detection signal or of the derived measurement signal.

For recognizing comparatively rapid signal changes over time, the control device can be adapted to recognize the presence of an object to be sensed in the sensing area at least in dependence on a specified (absolute or relative) minimum change in magnitude of the detection signal or/and of the derived measurement signal. In other words, the control device can be adapted to compare a current signal value with a reference value, for example by forming the quotient or by forming the difference, for which the mentioned moving average of previous signal values can be used, for example. If the current signal value differs from the reference value by at least a specified absolute or relative threshold amount, the control device can determine that a sufficiently pronounced signal change has occurred. It is recommended to use for the reference value an average formed from a plurality of sample values, since the use of an unchangeable, previously defined reference value can yield incorrect results owing to the mentioned, for example temperature-related, signal drift, and the use of a single sample value as the reference value can likewise be susceptible to errors owing to possible transient high-frequency signal interference. Where an average is mentioned within the scope of the present disclosure, this is to include any calculation rule which allows a further value to be determined from a number of given signal values. For example, the average can be an arithmetic average, a quadratic average or a median value.

As well as the operating temperature, the supply voltage of the light source element or/and of the photodetector element can be subject to fluctuations. For example, in domestic appliances with a power supply unit which generates a direct current supply voltage from an alternating current supply voltage, the possibility that the direct voltage that is generated will show interfering ripples or undesired signal peaks owing to the influence of current consumers or other electrical components cannot be ruled out. Such fluctuations in the supply voltage can likewise lead to signal changes of the detection signal of the photodetector element. Therefore, some embodiments provide that the control device is adapted to monitor the amplitude of a supply voltage of the light source element or/and of the photodetector element and to recognize the presence of an object to be sensed in the sensing area additionally in dependence on a specified condition relating to the amplitude of the supply voltage. If, for example, the monitoring of the supply voltage reveals that an observed change in the detection signal has occurred substantially at the same time as a change in the supply voltage, this can be an indication that the signal change in the detection signal is probably not attributable to the movement of an object to be sensed into the sensing area. In such a case, the control device can decide to disregard the signal change of the detection signal.

The threshold amount or the required minimum change in magnitude (i.e. the relative or absolute signal distance for distinguishing between the presence and the absence of an object to be sensed in the sensing area) can in some embodiments be adjusted by the control device in a calibration routine. In particular, the domestic appliance can be adapted to allow the end user to access the calibration routine in order that the user, within the context of a calibration procedure in which he or she deliberately moves an object to be sensed into the sensing area, can adjust the required signal distance between the presence and the absence of an object to be sensed and thus the detection range of the light sensor device.

If the domestic appliance is equipped, for example, with a window element through which the light source element emits its measuring beam, dirt or scratches on the window element can lead to signal changes of the detection signal no longer reaching the necessary magnitude to be recognized by the control device as an operating procedure or operating gesture when an object to be sensed is moved into the sensing area. It can then be necessary to carry out a calibration routine which allows the detection threshold to be adjusted. In some embodiments, the control device is prepared in terms of hardware or/and software for carrying out such a calibration routine. Some embodiments additionally provide that the purchaser of the domestic appliance receives together therewith a reflection standard which can be used in the calibration routine. The reflection standard can be, for example, a rod or other body with defined reflection properties for the measuring radiation emitted by the light source element.

In some embodiments, the reflection standard comprises a spacer which allows a reflection face of the reflection standard repeatedly to be accurately positioned at a defined distance and/or orientation relative to the light sensor device.

In some embodiments in which the light sensor device comprises a plurality of photodetector elements, the control device determines whether an object to be sensed is present or absent in the sensing area individually for each of the photodetector elements on the basis of the respective detection signal or/and the derived detector-specific measurement signal. From an overview of the detection signals or/and of the derived detector-specific measurement signals of all the photodetector elements, the control device can additionally be capable of determining a movement pattern of an object to be sensed in the sensing area. The movement pattern can be characterized by one or more parameters which represent a temporal or/and spatial movement profile. Suitable parameters can include, for example, a (minimum, maximum, average or/and time-dependent) speed of movement of the object to be sensed, a starting position, an end position or/and a movement distance of the object to be sensed. At the same time, at least one specified reference movement pattern can be stored, for example parametrically, in a memory of the control device. If the control device determines that there is sufficient similarity between the determined movement pattern and a reference movement pattern, it can interpret the presence of the object to be sensed in the sensing area as an intentional operating gesture and activate the actuator.

Some embodiments of the present invention provide a light sensor device for a domestic electrical appliance, comprising: a window element formed of a light-permeable material; at least one infrared-light source element arranged to radiate infrared light through the window element from an interior side of the window element towards an exterior side thereof; at least one infrared-sensitive photodetector element arranged to detect infrared light which strikes the photodetector element from the interior side of the window element; and at least one visible-light source element arranged to radiate visible light into the window element from the interior side thereof.

The window element may be formed as an elongate, arcuate strip, wherein the at least one infrared-light source element and the at least one infrared-sensitive photodetector element are arranged at an arc-inner side of the window element, and wherein the at least one infrared-light source element is arranged to radiate infrared light through the window element from the arc-inner side of the window element towards an arc-outer side thereof.

The at least one infrared-light source element may be mounted on a circuit board which is oriented substantially parallel to an arc plane of the window element.

The window element is formed in certain embodiments as an elongate strip, wherein the at least one infrared-light source element includes a plurality of infrared-light source elements arranged distributed along a strip longitudinal direction of the window element, wherein the at least one photodetector element includes a plurality of photodetector elements arranged distributed along the strip longitudinal direction, and wherein the at least one visible-light source element includes a plurality of visible-light source elements arranged distributed along the strip longitudinal direction. Here, the plurality of infrared-sensitive photodetector elements may be arranged along the strip longitudinal direction of the window element in interleaved distribution with the plurality of infrared-light source elements.

In certain embodiments, the at least one infrared-light source element and the at least one visible-light source element are mounted on opposite faces of a circuit board, wherein the window element is arranged adjacent to an edge of the circuit board to project beyond the circuit board on both faces thereof.

In certain embodiments, the at least one infrared-light source element is mounted on a first face of a circuit board, wherein the window element is arranged adjacent to an edge of the circuit board to project beyond the first face of the circuit board, and wherein a main beam axis of each of the at least one infrared-light source element is oriented substantially parallel or at an acute angle of not more than ±30 degrees or not more than ±20 degrees or not more than ±10 degrees to the first face of circuit board. In such embodiments, the at least one visible-light source element may be mounted on a second face of the circuit board opposite the first face, wherein the window element projects beyond the second face of the circuit board, and wherein a main beam axis of each of the at least one visible-light source element is oriented substantially parallel or at an acute angle of not more than ±30 degrees or not more than ±20 degrees or not more than ±10 degrees to the second face of circuit board.

Certain embodiments of the light sensor device further comprise a diaphragm member disposed between the window element and the edge of the circuit board, the diaphragm member projecting beyond the first face of the circuit board, wherein the diaphragm member defines at least one of: a diaphragm contour in relation to each of the at least one photodetector element for limiting a spatial detection range of the at least one photodetector element; and a diaphragm contour in relation to each of the at least one infrared-light source element for limiting a spatial emission range of the at least one infrared-light source element. The diaphragm member may comprise a single diaphragm body formed of infrared-impermeable material and having a diaphragm contour for each of the at least one photodetector element and each of the at least one infrared-light source element.

In certain embodiments, a portion of an outer surface of the window member forms a light deflection face for deflecting, by total reflection, visible light, which has been radiated from the at least one visible-light source element into the window element, towards a region of the window element through which infrared light is radiated from the at least one infrared-light source element.

Some embodiments of the present invention provide a front-loader washing machine comprising: a machine body; a door, movably mounted on the body, for closing a washing chamber formed in the machine body; a door mechanism at least for opening the closed door; a light sensor device mounted on the door and having a sensing area, wherein the light sensor device comprises a plurality of infrared-light source elements and a plurality of infrared-sensitive photodetector elements, each of the plurality of photodetector elements configured to provide an electrical detection signal; a control device configured to recognize, based on the detection signal of at least one of the plurality of photodetector elements, the presence of an object in the sensing area and control, based on a recognition of the presence of the object in the sensing area, an actuation of the door mechanism.

In certain embodiments of the front-loader washing machine, the plurality of infrared-light source elements are arranged distributed in an arcuately curved row along a circumference of the door, wherein at least one of the plurality of photodetector elements is disposed between each pair of adjacent infrared-light source elements of the plurality of infrared-sensitive photodetector elements.

Some embodiments of the present invention provide a domestic electrical appliance comprising: an actuator; a light sensor device for detecting the presence of an object in a sensing area of the light sensor device, the light sensor device having a sensing area; and a control device coupled to the light sensor device, wherein the light sensor device comprises: a window element formed of a light-permeable material; at least one infrared-light source element arranged to radiate infrared light through the window element from an interior side of the window element towards an exterior side thereof; at least one infrared-sensitive photodetector element arranged to detect infrared light which strikes the photodetector element from the interior side of the window element, each of the at least one photodetector element configured to provide an electrical detection signal; and at least one visible-light source element arranged to radiate visible light into the window element from the interior side thereof, wherein the control device is configured to recognize, based on the detection signal of one or more of the at least one photodetector element, the presence of an object in the sensing area and control the actuator based on a recognition of the presence of the object in the sensing area, wherein the control device is configured to: determine a reference value based on one or more samples of the detection signal of one or more of the at least one photodetector element; compare a current measurement value related to the detection signal of one or more of the at least one photodetector element with the reference value; and recognize the presence of an object in the sensing area based on a result of the comparison of the current measurement value with the reference value.

In certain embodiments of this domestic appliance, the control device is configured to compare the current measurement value with the reference value by determining at least one of a ratio and a difference between the current measurement value and the reference value.

Certain embodiments provide that the control device is configured to update the reference value by determining a moving average of the detection signal of one or more of the at least one photodetector element.

According to certain embodiments, the current measurement value is a detector-specific measurement value, wherein the reference value is a detector-specific reference value or is common for all photodetector elements.

In certain embodiments, the control device is configured to recognize the presence of an object in the sensing area based on the current measurement value differing from the reference value by at least a predetermined absolute or relative threshold value. The control device may be configured to adjust the threshold value in a calibration routine.

The control device control device is in certain embodiments configured to monitor the amplitude of a supply voltage of the at least one infrared-light source element or of the at least one photodetector element and to recognize the presence of an object in the sensing area additionally based on the amplitude of the supply voltage satisfying a predetermined condition.

BRIEF DESCRIPTION OF THE DRAWINGS

The invention will be explained in more detail hereinbelow with reference to the accompanying drawings, in which:

FIG. 1 shows, in diagrammatic form, a domestic washing machine having a door opening function which can be activated in a touch-free manner by a user, according to one exemplary embodiment, FIG. 3 shows, in diagrammatic form, an exemplary change over time of a detector-specific measurement signal of the light sensor device of FIGS. 2a to 2c, FIG. 4 is a partially cutaway view of a light sensor device according to a further exemplary embodiment, looking in a direction parallel to a door plane of the washing machine of FIG. 1, FIG. 5 shows, in perspective, part of the light sensor device of FIG. 4 together with an exemplary reflection standard, FIG. 6 shows the part shown in FIG. 5 of the light sensor device in a different perspective and partially cut away, FIG. 7 shows another embodiment of a light sensor device in accordance with the present invention.

DETAILED DESCRIPTION

Figure 2A:
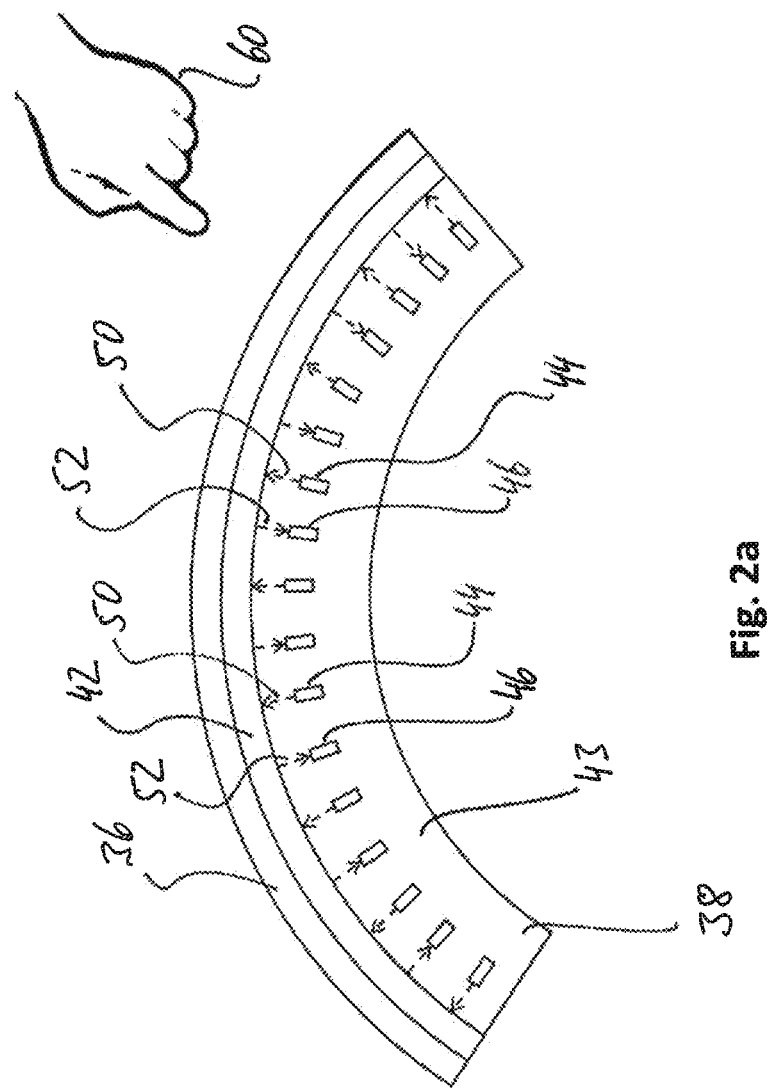
FIG. 2a shows, in diagrammatic form, a light sensor device in a plan view of a board side of a circuit board of the light sensor device according to one exemplary embodiment.

Reference will first be made to FIG. 1. The washing machine shown in diagrammatic form therein in a front view is designated generally 10. It is provided for use in a private household and in the example shown is of the front-loader type, in which there is arranged on a front side of a machine body (appliance body) 12 of the washing machine 10 a door 14 for closing an access opening which provides access to a washing chamber (generally: working or process chamber) 16 formed in the machine body 12. The door 14 is in the form of a bull's-eye door and has a transparent bull's-eye 18 which allows a user to see into the washing chamber 16 through the closed door 14. The bull's-eye 18 is enclosed in a bull's-eye frame 20 which surrounds the bull's-eye 18 in an annular manner and is typically made of a white plastics material. The door 14 is mounted on the machine body 12 so as to be pivotable about a vertical pivot axis by means of a hinge 21.

A door latch 22, which is shown only in diagrammatic form as a block, allows the door 14, after it has been closed, to be held in the closed position and if desired also locked in order to secure it against being manually opened by a user while a washing program is running. The door latch 22 can be of conventional construction; for example, the door latch 22 can comprise a closing shackle (not shown in detail) mounted on the door 14 which, on closing of the door 14, enters an insertion opening of a closing unit (not shown in detail) which is mounted on the machine body 12 on a front body wall 24 on the rear side of the wall and which holds the closing shackle when the door 14 is closed and thereby secures the door 14 against opening. The closing unit can comprise a rotary gripper, for example, which has a gripping mouth for holding the closing shackle, as is shown and described, for example, in DE 198 37 248 A1, the content of which is hereby incorporated in its entirety by explicit reference.

A door opener 26 (door mechanism) allows the closed door 14 to be pushed open automatically without the user having to actively pull on the door 14 for this purpose. For example, the door opener 26 comprises a pusher 28 which is movable between an advanced and a retracted position and which can be arranged on the machine body 12 or alternatively on the door 14 and the transfer of which from the retracted position into the advanced position can be initiated or effected by activation of an electrically controllable actuator 30, for example an electromagnetic actuator or an electromotive actuator or an actuator equipped with a wax motor. As a result of the movement into the advanced position, the pusher 28 pushes the closed door 14 open by means of a leading push head 31. The door opener 26 can be of conventional construction, for example as shown and described in DE 10 2018 008 895 A1, the content of which is hereby incorporated in its entirety by explicit reference.

The actuator 30 of the door opener 26 is under the control of a control unit 32, which can activate the actuator 30 under program control but at least also in response to the recognition of an operating gesture of the user. For this purpose, the washing machine 10 is equipped with a luminous panel 34, which in the example shown is arranged on the door 14 and always illuminates when the door 14 is closed. Behind the luminous panel 34 there is arranged a sensor system, which is not shown in detail in FIG. 1 but will be described in detail hereinbelow with reference to the further figures, which sensor system operates by the light sensor principle and allows touch-free recognition of the approach of a body part of the user, for example a hand or a finger, into a sensing area formed in front of the luminous panel 34. Accordingly, the user does not have to touch the luminous panel 34; it is sufficient for him to move a finger, for example, sufficiently close to the luminous panel 34 that the finger enters the monitorable range of the sensor system. By evaluating electrical signals which are provided by the sensor system, the control unit 32 recognizes the presence or absence of an object to be sensed in the sensing area in front of the luminous panel 34. If the control unit 32 determines a suitable operating gesture of the user, it activates the door opener 26 in order to open the door 14—if it is closed. On opening of the door 14, the luminous panel 34 can become dark, and it can illuminate again when the door is subsequently closed.

The luminous panel 34 is formed by a window element 36 which is inserted into the bull's-eye frame 20 and is freely visible to a user standing in front of the door 14 when the door 14 is closed, which window element is made, for example, of a light-permeable plastics material which, however, is opaque or has other light-scattering structures. Behind the window element 36, a circuit board 38 depicted by a broken line in FIG. 1 is accommodated in the door 14. The circuit board 38 carries various electrical and optoelectronic components of the mentioned sensor system; it additionally carries a light source arrangement, which generates the visible light required to illuminate the luminous panel 34. For further details, reference will now be made to the further FIGS. 2a, 2b and 2c.

Those figures show, in diagrammatic form, a light sensor device 40 which comprises the window element 36, the circuit board 38 and a diaphragm body 42. The circuit board 38 is fitted on a first of its board sides, designated 43, with a row arrangement of IR light-emitting diodes 44 and IR photodetectors 46, which follow one another alternately along the row. The circuit board is 38 is installed in the door 14 with its board plane substantially parallel to a door plane, indicated in FIG. 2c by a dot-and-dash line at 48, of the door. When the door 14 is seen from above, the circuit board 38 extends over an arc angle of, for example, more than 20 degrees or more than 30 degrees or more than 40 degrees or more than 45 degrees of the door circumference and has correspondingly arcuately curved radially inner and outer board edges. The IR light-emitting diodes 44 and the IR photodetectors 46 (which form a second light source arrangement or a photodetector arrangement within the meaning of the present disclosure) are arranged one behind the other along an arc-shaped line running in the door circumferential direction, wherein in the example show one IR photodetector 46 is in each case arranged between two IR light-emitting diodes 44. Alternatively, it is conceivable to arrange two IR photodetectors 46 between two IR light-emitting diodes 44 or/and to arrange two IR light-emitting diodes 44 between two IR photodetectors 46. Overall, the row arrangement of the IR light-emitting diodes 44 and IR photodetectors 46 extends over an arc length of, for example, at least 15 centimeters or at least 20 centimeters or at least 25 centimeters. For example, the IR light-emitting diodes 44 can be arranged along the arc-shaped row with a mutual spacing of from about 0.5 to about 1.5 centimeters; a corresponding line density along the arc-shaped row is then obtained for the IR photodetectors 46, which can be formed by infrared-sensitive phototransistors, for example.

In a modified embodiment, it is conceivable not to arrange the IR light-emitting diodes 44 and the IR photodetectors 46 distributed on a common arcuate line but rather to arrange the IR light-emitting diodes 44 distributed on a first arcuate line (on an "emitter arc", as it were) and the IR photodetectors 46 distributed on a second arcuate line (on a "detector arc", as it were), wherein the emitter arc and the detector arc overlap in the circumferential direction but lie on different radii.

Figure 2B:
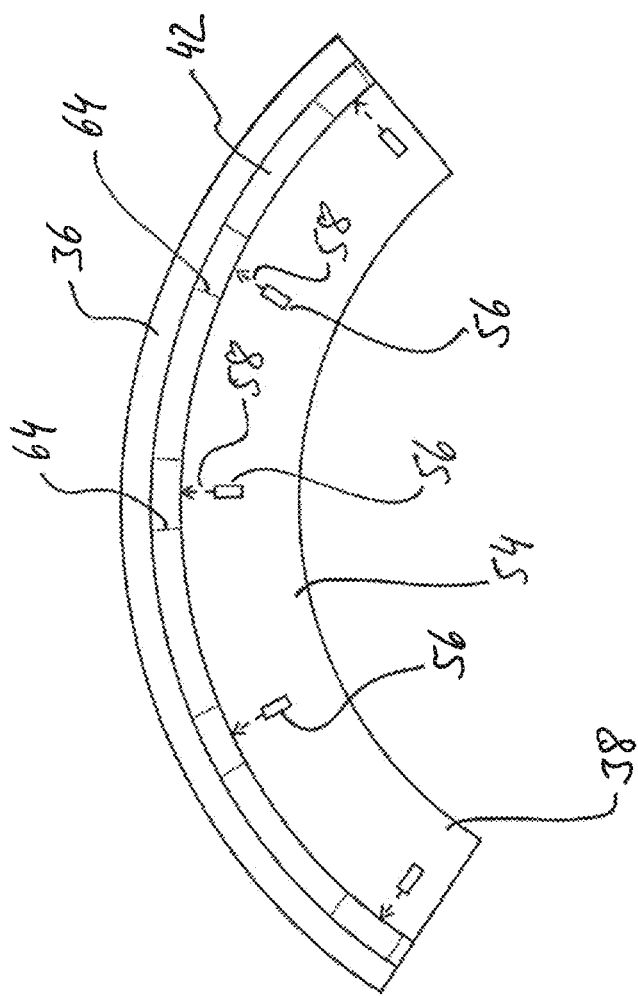
FIG. 2b shows the light sensor device of FIG. 2a in a plan view of an opposite board side of the circuit board.
Figure 2C:
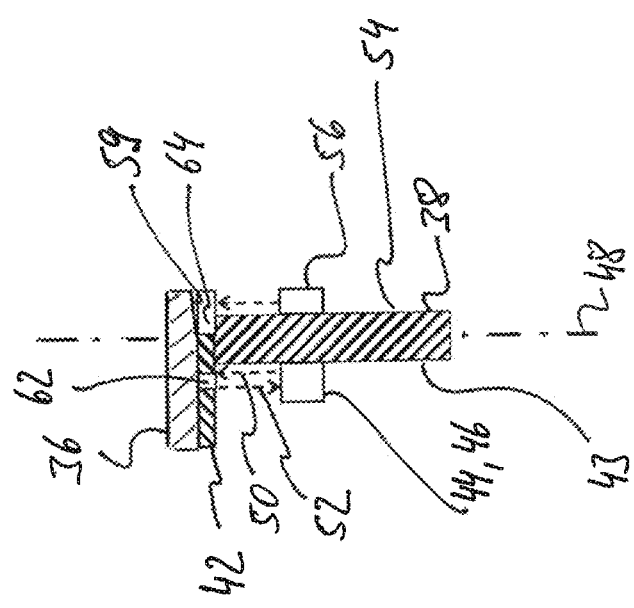
FIG. 2c is a radial section through the light sensor device of FIGS. 2a and 2b.

The IR light-emitting diodes 44 are arranged on the circuit board 38 with such an orientation that their main radiation direction, indicated in FIGS. 2a and 2c by a direction arrow 50, runs substantially parallel to the board plane of the circuit board 38 or at a small acute angle of, for example, not more than ±30 degrees or not more than ±20 degrees or not more than ±10 degrees relative to the board plane of the circuit board 38 (see FIG. 2c). The main radiation direction 50 is the direction in which a maximum intensity of the radiation emission of the IR light-emitting diodes 44 is to be observed. When the circuit board 38 is seen from above, the IR light-emitting diodes 44 have a radiation emission directed generally toward the outer circumference of the door 14, wherein their main radiation direction 50 runs, for example, radially (i.e. radially with respect to the center of the door 14) or at an angle of, for example, not more than ±30 degrees or not more than ±20 degrees or not more than ±10 degrees relative to the radial direction of the door 14 (see FIG. 2a). For example, the IR light-emitting diodes 44 can all have substantially the same main radiation direction 50 relative to the radial direction of the door 14; alternatively, it is conceivable that the IR light-emitting diodes 44, when the circuit board 38 is seen from above, have main radiation directions 50 which are oriented substantially parallel to one another, so that, for different IR light-emitting diodes 44, the main radiation direction 50 relative to the radial direction of the door 14 is different.

Corresponding to the main emission direction of the IR light-emitting diodes 44, the photodetectors 46 have a main detection direction which is indicated in each case by a direction arrow 52 and which—when seen in a radial section according to FIG. 2c— runs substantially parallel or at a small acute angle of, for example, not more than ±30 degrees or not more than ±20 degrees or not more than ±10 degrees relative to the board plane of the circuit board 38 and—when the circuit board 38 is seen from above according to FIG. 2a— extends radially or at an angle of, for example, not more than ±30 degrees or not more than ±20 degrees or not more than ±10 degrees relative to the radial direction of the door 14. The main detection direction 52 is the direction in which the IR photodetectors 46 have maximum detection sensitivity. Again—when the circuit board 38 is seen from above—the main detection directions 52 of the IR photodetectors 46 can all be oriented substantially radially or at substantially the same angle relative to the radial direction of the door 14, or the IR photodetectors 46 can have main detection directions 52 which are oriented substantially parallel to one another. The main detection directions 52 of the IR photodetectors 46 can have the same or a different orientation pattern with respect to the radial direction of the door 14 or/and the board plane of the circuit board 38 as the main radiation directions 50 of the IR light-emitting diodes.

On its opposite board side, designated 54, the circuit board 38 is fitted with a row arrangement of visible light light-emitting diodes 56, which form a first light source arrangement within the meaning of the present disclosure and, similarly to the row arrangement of the IR light-emitting diodes 44 and the IR photodetectors 46, are arranged distributed along a curved line running parallel to the door circumference of the door 14. Unlike the IR light-emitting diodes 44, which have a maximum intensity of their radiation emission in the range of infrared wavelengths, for example between about 800 nm and about 1300 nm, and in any case emit predominantly infrared light, the visible light light-emitting diodes 56 have a maximum intensity of their radiation emission in the range of visible wavelengths and in any case emit predominantly visible light. In particular, the visible light light-emitting diodes 56 emit broadband light, which generates the impression of white light for the user. The visible light light-emitting diodes 56 have a main radiation direction 58 which, similarly to the main radiation direction 50 of the IR light-emitting diodes 44, runs substantially parallel to the board plane of the circuit board 38 or at a small acute angle thereto, wherein this angle is, for example, not more than ±30 degrees or not more than ±20 degrees or not more than ±10 degrees. When the circuit board 38 is seen from above, the main radiation directions 58 run, for example, radially or at an angle of, for example, not more than ±30 degrees or not more than ±20 degrees or not more than ±10 degrees relative to the radial direction of the door 14. The main radiation directions 58 of the visible light light-emitting diodes 56 can all have substantially the same orientation with respect to the radial direction of the door 14, or alternatively they can be oriented substantially parallel to one another and consequently each assume a different angle relative to the radial direction of the door 14.

The window element 36 extends radially outside the circuit board 38 in the manner of an arcuately curved window strip, substantially over the entire arc length of the circuit board 38. As can be seen in particular in the radial section according to FIG. 2c, the window element 36 in the example shown has a main plane of extent (window plane) which runs substantially perpendicular to the board plane of the circuit board 38. Expressed in other words, the circuit board 38 is arranged at an arc-inner side of the window element 36 with a substantially parallel orientation to an arc plane of the window element 36.

The purpose of the visible light light-emitting diodes 56 is to illuminate the window element 36 so that it can be perceived by the user as a luminous operating panel. In order to achieve this purpose, the window element 36—when seen in the radial section according to FIG. 2c— projects beyond the second board side 54 perpendicular to the board plane of the circuit board 38, so that light emitted by the visible light light-emitting diodes 56 can strike and enter the window element 36. Likewise, the window element 36 also projects beyond the first board side 43 perpendicular to the board plane of the circuit board 38, and for this reason infrared light emitted by the IR light-emitting diodes 44 also strikes the window element 36. The luminous panel 34, which is perceived by the user as an operating panel, is consequently irradiated not only by the visible light of the visible light light-emitting diodes 56 but also by the infrared light of the IR light-emitting diodes 44. The radiation of the infrared light of the IR light-emitting diodes 44 takes place from the same window side of the window element 36 as the radiation of the visible light of the visible light light-emitting diodes 56. In the illustration of FIG. 2c, this is the (radially inwardly directed) lower side of the window element 36. Above the window element 36, that is to say on the radially outer window side, there is free space in the installation situation of the light sensor device 40 for the user to move his hand into the vicinity of the window element 36. In this respect, a hand is shown diagrammatically in FIG. 2a. In the installation situation, the window element 36 is located, for example, on the outer circumference of the door 14, so that the user can move his hand toward the window element 36 from radially outside the door 14. The detection range of the light sensor device 40 is, for example, a few centimeters, e.g. from about 2 to about 3 centimeters. This means that a user must move his hand to within about 2 to 3 centimeters from the window element 36 in order that the presence of his hand can be recognized by the light sensor device 40 and interpreted as an operating gesture. It will be appreciated that the detection range can be shorter or longer than the indicated numerical example.

In order to permit touch-free detection of an operating gesture of the user, infrared light emitted by the IR light-emitting diodes 44 must pass through the window element 36 and enter the sensing area located on the other side of the window element 36, that is to say on its radially outer side, in order that it can be reflected there by the body part of the user that has been moved into the sensing area. The diaphragm body 42 inserted or extending between the window element 36 and the radially outer board edge of the circuit board 38 ensures that only infrared light that is emitted by the IR light-emitting diodes 44 within a specific solid angle range strikes the window element 36. For this purpose, the diaphragm body 42, which is made of an IR-impermeable material, for example a colored (e.g. black) plastics material, is designed with a completely surrounded diaphragm opening 62 in association with each of the IR light-emitting diodes 44. The diaphragm body 42 also has such a diaphragm opening 62 in association with each of the IR photodetectors 46. The diaphragm body 62 thereby limits the spatial range from which IR radiation can strike the IR photodetectors 46 to a specific solid angle. The diaphragm openings 62 associated with the IR photodetectors 46 can be of such a form and size that, at least within the detection range of the light sensor device 40, the detection cones, defined by the diaphragm openings 62, of the IR photodetectors 46 do not overlap. In other embodiments, however, it can be provided that the detection cones of adjacent IR photodetectors 46 within the detection range of the light sensor device 40 are adjacent to one another or even overlap. The diaphragm openings 62 are arranged distributed along a curved line, corresponding to the arrangement of the IR light-emitting diodes 44 and the IR photodetectors 46 in a row, wherein they are alternately associated with one of the IR light-emitting diodes 44 and one of the IR photodetectors 46. The diaphragm openings 62 can have, for example, circular or elliptical opening cross-sections or another suitable cross-sectional form.

The diaphragm body 42 also performs a diaphragm function for the light of the visible light light-emitting diodes 56. However, the diaphragm body 42 in the exemplary embodiment shown does not have completely surrounded diaphragm openings in association with the visible light light-emitting diodes 56 but forms in association with each of the visible light light-emitting diodes 56 a diaphragm contour in the form of an edge recess 64 which is completed to form a completely surrounded diaphragm opening only by a cover part (not shown in detail) which is to be fitted to the diaphragm body 42 from the board side 54 and covers the circuit board 38. The edge recess 64 can correspond to the form of a partial circle or partial ellipse, for example.

The window element 36 has on its window lower side, in the region projecting beyond the board side 54, at least directly above the visible light light-emitting diodes 56, a light incident face 59 for the light of the visible light light-emitting diodes 56, which light incident face is oriented obliquely to the board plane of the circuit board 38 and obliquely to the main radiation direction 58 of the visible light light-emitting diodes 56. The oblique orientation of the light incident face 59 causes the emitted light of the visible light light-emitting diodes 56 to be deflected and thus all parts of the window element 36 to be flooded with light— including those parts that are not struck directly by the light of the visible light light-emitting diodes 56 and are located on the far side of the board side 43.

In a minimal configuration, it can be sufficient for the light sensor device 40 to contain only a doublet of a single IR light-emitting diode 44 and a single IR photodetector 46 or only a triplet of either two IR light-emitting diodes 44 and one IR photodetector 46 arranged therebetween or of two IR photodetectors 46 and one IR light-emitting diode 44 arranged therebetween. A larger number of IR light-emitting diodes 44 and IR photodetectors 46 allows the sensing area which can be monitored by the light sensor device 40 to be enlarged and thus provides more room for the operating gestures of the user. A larger number of IR light-emitting diodes 44 and IR photodetectors 46 can also make it possible, or at least make it easier, to determine not only the mere presence or absence of an object to be sensed in the monitored sensing area but also to recognize more complex movement patterns of an object to be sensed in the monitored sensing area and thereby distinguish intentional operating gestures from random, unintentional hand gestures of the user, which are not intended as operating gestures. At least in some embodiments, assuming that the number of IR light-emitting diodes 44 is n, the number of IR photodetectors 46 is either likewise n or is n−1 or n+1. Alternatively, it is conceivable to provide, for example, a number n/2 or 2n of IR photodetectors 46.

The IR photodetectors 46 each generate an electrical detection signal, for example in the form of a detector current representative of the intensity of the detected IR radiation. By means of a measuring resistor (not shown in detail but conventional per se), a corresponding voltage signal can be generated from such a detector current, the voltage amplitude of which voltage signal represents the detected radiation intensity. The control unit 32 receives the detection signals of the IR photodetectors 46 or analog or digital measurement signals derived from the detection signals but representative of the change over time in the detection signals (e.g. electrical measurement voltage signals tapped at a measuring resistor) and evaluates the detection signals or measurement signals obtained in order to recognize the presence of the hand 60, or of a finger thereof or of another object to be sensed that reflects IR radiation, in the sensing area monitored by the light sensor device 40. At least parts of the control unit 32 can be mounted on the circuit board 38, but the electrical and electronic components of the control unit 32 can alternatively be mounted separately from the circuit board 38 at a different location in the washing machine 10. In some embodiments, the control unit 32 evaluates the time-dependent change in the detection signal of a particular IR photodetector 46, or of a detector-specific measurement signal derived therefrom, individually for each of the IR photodetectors 46. This will be explained in greater detail hereinbelow with reference to FIG. 3 and the exemplary change over time of a detector-specific measurement signal s(t) shown in diagrammatic form therein.

In FIG. 3, the measurement signal s(t), which is representative of the change over time of the detection signal of one of the IR photodetectors 46, is shown as a solid line which is broken in some places in order to illustrate different measurement time periods. The measurement signal s(t) can be a continuous signal, in particular when the IR light-emitting diodes 44 emit infrared radiation continuously. However, it can be expedient, for reasons of energy saving, to operate the IR light-emitting diodes 44 in pulse operation, wherein the pulse repetition rate is sufficiently high to be able to detect even comparatively rapid hand movements of a user. For example, the IR light-emitting diodes 44 can be operated with a pulse repetition rate of not less than 1 Hz or not less than 2 Hz or not less than 5 Hz or not less than 10 Hz or not less than 20 Hz or not less than 50 Hz. Irrespective of whether the IR light-emitting diodes 44 are operated in continuous-wave operation or in pulse operation, the control unit 32 evaluates only time-discrete sample values of the measurement signal s(t). The rate of the sample values can be, for example, at least 1 Hz or at least 2 Hz or at least 5 Hz or at least 10 Hz or at least 20 Hz or at least 50 Hz and, where the IR light-emitting diodes 44 operate in pulse operation, can correspond to the pulse repetition rate of the IR light-emitting diodes 44. In order to simplify the drawing, individual sample values are not shown in FIG. 3; instead, the measurement signal s(t) is shown as a continuous signal, but this is solely for the purpose of the diagrammatic illustration and is in no way to be understood as being limiting.

In a first measurement time period $\Delta t_1$, which extends, for example, over several seconds or even several minutes, the measurement signal s(t) in the example shown in FIG. 3 has a substantially constant magnitude, as is the case in a second measurement time period $\Delta t_2$, which likewise extends, for example, over several seconds or even several minutes, wherein, however, the signal magnitude of the measurement signal s(t) in the second measurement time period $\Delta t_2$ has a slightly larger value than in the first measurement time period $\Delta t_1$. The increased signal magnitude in the second measurement time period $\Delta t_2$ compared to the first measurement time period $\Delta t_1$ is due, for example, to intermediate cooling of the IR light-emitting diodes 44, when, after an operating cycle of the washing machine 10 has been carried out in which the washing water was heated, for example, up to about 90 degrees Celsius and the heat of the washing water was emitted into the region where the circuit board 38 with the IR light-emitting diodes 44 mounted thereon is seated, the heat slowly escapes again. However, in the case of some forms of 1R light-emitting diodes that are available on the market, an increased operating temperature of the IR light-emitting diodes 44 can lead to weaker radiation emission. Conversely, an increased operating temperature of the IR photodetectors 46, at least in the case of some forms of IR phototransistors available on the market, can increase the efficiency thereof. All these effects can lead to fluctuations in the operating temperature of the IR light-emitting diodes 44 and of the IR photodetectors 46 being reflected in fluctuations in the detection signal of the IR photodetectors 46.

In a practical implementation of the light sensor device 40, it cannot be assumed that the IR photodetectors 46 routinely output an exact zero signal as long as there is no object to be sensed in the sensing area. Instead, it must be assumed that the IR photodetectors 46 output a detection signal other than zero even when there is no object to be sensed in the sensing area. Thus, even ambient light (sunlight, artificial room lighting) can contain spectral components in the sensitivity range of the IR photodetectors 46. Scattering effects, on the basis of which infrared light emitted by the IR light-emitting diodes 44 reaches the IR photodetectors 46 by scattering in the window element 36, for example, can also often not be ruled out completely. If the radiation emission of the IR light-emitting diodes 44 or/and the efficiency of the IR photodetectors 46 changes as a result of the temperature, the detection signal outputted by the IR photodetectors 46 can therefore fluctuate as a result of such scattering effects. Moreover, a signal drift of the measurement signal s(t) can occur, for example, due to dirt on the window element 36. Various effects can accordingly lead to the measurement signal s(t) having different signal strengths at different times despite the absence of an object to be sensed in the sensing area, as is shown diagrammatically in FIG. 3 for the measurement time periods $\Delta t_1$ and $\Delta t_2$, which can be several tens of minutes or several hours apart, for example.

The possible influences on the signal magnitude of the measurement signal s(t) which have been discussed show that a simple comparison of a current sample value of the measurement signal s(t) with a specified, unchangeable threshold value is not suitable for reliably determining the presence of an object to be sensed in the sensing area. Therefore, the control unit 32 does not assess comparatively slow changes in the signal magnitude of the measurement signal s(t) as the entry of an object into the sensing area; the requirement for such a determination is a sufficiently rapid change in the signal magnitude of the measurement signal s(t). FIG. 3 shows diagrammatically, in a measurement time period $\Delta t_3$, an exemplary change in the measurement signal s(t) for the case where an IR-reflecting object to be sensed moves into the monitored area of the IR photodetector 46 in question.

In order to compensate for long-term drift effects of the measurement signal s(t), the control unit 32 can use, for example, a moving average technique, in which an average of the measurement signal s(t) is repeatedly calculated on the basis of a continually updated group of a specific number of last sample values of the measurement signal. Only sample values that move relative to one another within a given (absolute or relative) magnitude bandwidth, for example, are included in the calculation of the average. This magnitude bandwidth is chosen to be sufficiently narrow that it permits for the calculation of the average only those sample values for which it can reliably be assumed that they are not influenced by the presence of an object to be sensed in the sensing area. If a current sample value differs from the applicable average of the measurement signal s(t) by a specific absolute or relative threshold amount, this can be an indication that an object to be sensed has moved into the sensing area.

However, a sudden rise in the measurement signal s(t) can not only be caused by the movement of an object to be sensed into the sensing area. It is conceivable that a direct current supply voltage of the IR light-emitting diodes 44 does not have perfect constancy but can exhibit brief voltage peaks or other ripples, which can be caused, for example, by imperfect working of a power supply unit of the washing machine 10 which generates the direct current supply voltage from an alternating mains voltage. Therefore, the control unit 32 also monitors the supply voltage of the IR light-emitting diodes 44 (or the supply voltage of the light sensor device 40 in general) in parallel with the measurement signal s(t). If the control unit 32 determines a significant change in the level of the supply voltage at the same time as a significantly rapid change in the measurement signal s(t), it may therefore be that the control unit 32 does not recognize the presence of an object to be sensed in the sensing area but disregards the detected change in the measurement signal s(t). Such a situation is shown diagrammatically in FIG. 3 in a measurement time period $\Delta t_4$. A direct current supply voltage u(t) is depicted by a broken line and shows a brief voltage fluctuation which is accompanied by a correspondingly brief fluctuation in the measurement signal s(t). Only when a significant change in the measurement signal s(t) is observed with sufficient constancy of the supply voltage does the control unit 32 determine the presence of an object to be sensed in the sensing area as the cause of the signal change of the measurement signal s(t).

In the exemplary embodiment shown in FIGS. 4 to 6, components which are identical or have the same effect are designated by the same reference numerals as in the preceding figures. Reference is made for the explanation of such components to the preceding remarks made in connection with FIGS. 1 to 3.

In FIG. 5 there is shown in diagrammatic form, in addition to the light sensor device 40, a reflection standard 68 having a spacer 70 which can be used within the context of a calibration routine. The reflection standard 68 has a reflection face 72 with defined IR reflection properties (which can be similar or identical to those of human skin, for example) and can be used in the factory during production of the washing machine 10. If required, the reflection standard 68 can be delivered to the end customer together with the washing machine 10 or can be supplied to the end customer as an accessory which is obtainable separately.

Performing the calibration routine can serve to adjust the absolute or relative threshold amount by which a sample value must differ from a currently applicable reference value, determined by forming a moving average, for example, in order for the presence of an object to be sensed in the sensing area to be recognized. Such a calibration can not only be carried out during production but in some embodiments can also be carried out from time to time by the user or by maintenance personnel in order, for example, to take account of dirt on s components of the light sensor device 40 or/and age-related changes in the optoelectronic properties of the IR light-emitting diodes 44 or/and of the IR photodetectors 46. The calibration in a sense sets the required delta (relative or absolute) between the resting signal level of the IR photodetectors 46 (i.e. in the absence of an object to be sensed in the sensing area) and the signal level above which the control unit 32 recognizes the presence of an object to be sensed in the sensing area. The sensing range of the light sensor device 40 is ultimately set via this required signal distance. In the factory, a standard sensing range can be set in this respect, while the end user can set an individual sensing range, if required, by executing the calibration routine.

It will be appreciated that an operator—whether it be during production or the end user—can also carry out the calibration directly using his own hand as the calibration standard. The calibration routine can be called up, for example, via a program selector with which a user can set different washing programs.

Schematically shown in FIG. 7 is a light sensor device 80 having a window element 82, one or more IR source elements 84 (which may correspond, e.g., to the IR light-emitting diodes 44) and one or more visible-light (e.g., blue light or white light) source elements 86 (which may correspond, e.g., to the light-emitting diodes 56). The window element 82 may be in an elongate, straight strip form with the strip longitudinal direction extending perpendicularly to the drawing plane of FIG. 7. There may be a plurality of IR source elements 84 disposed one after another in a straight row extending in the strip longitudinal direction. The light sensor device 80 further includes one or more IR-sensitive photodetectors (not shown in FIG. 7), which may correspond, e.g., to the IR photodetectors 46. The IR-sensitive photodetectors of the light sensor device 80 may be disposed in an interleaved fashion with the IR source elements 84 in the strip longitudinal direction, so that between each pair of adjacent IR source elements 84 there is located one (or two) IR-sensitive photodetectors. The visible-light source elements 86 may also be arranged distributed in the strip longitudinal direction in a separate row from the IR source elements 84. The IR source elements 84, the IR-sensitive photodetectors and the visible-light source elements 86 are mounted on a common circuit board 88 on the same side of the circuit board 88.

The window element 82 has an outer surface 90 which comprises an interior face 92, an exterior face 94 and a slanted deflection face 96. The window element 82 has at its exterior face 94 a protruding rib 98 engaging in a recess formed in a light-impermeable cover member 100. IR-light from the IR source elements 84 and visible light from the visible-light source elements 86 is radiated into the window element 82 from the interior side of the window element 82 and can leave the window element 82 at the exterior face 94 where the rib 98 is located. As can be seen, the IR source elements 84 are disposed in alignment with the rib 98 whereas the visible-light source elements 86 are disposed laterally offset with respect to the rib 98. In order to illuminate the window element 82 in the region of the rib 98, the deflection face 96 serves to totally reflect light which is radiated from the visible-light source elements 86 into the window element 82. The deflected visible light travels inside the material of the window element 82 toward the region of the rib 98.

What is claimed is:

1. A light sensor device for a domestic electrical appliance, comprising:
a window element formed of a light-permeable material;

at least one infrared-light source element arranged to radiate infrared light through the window element from an interior side of the window element towards an exterior side thereof;

at least one infrared-sensitive photodetector element arranged to detect infrared light which strikes the photodetector element from the interior side of the window element; and at least one visible-light source element arranged to radiate visible light into the window element from the interior side thereof;

wherein the at least one infrared-light source element and the at least one visible light-source element are mounted on opposite faces of a circuit board, wherein the window element is arranged adjacent to an edge of the circuit board to project beyond the circuit board on both faces thereof;

wherein the at least one infrared-light source element and the at least one infrared-sensitive photodetector element are mounted on a first face of a circuit board; and wherein the at least one visible-light source element is mounted on a second face of the circuit board opposite the first face.

2. The light sensor device of claim 1, wherein the window element is formed as an elongate, arcuate strip, wherein the at least one infrared-light source element and the at least one infrared-sensitive photodetector element are arranged at an arc-inner side of the window element, and wherein the at least one infrared-light source element is arranged to radiate infrared light through the window element from the arc-inner side of the window element towards an arc-outer side thereof.

3. The light sensor device of claim 2, wherein the at least one infrared-light source element is mounted on a circuit board which is oriented substantially parallel to an arc plane of the window element.

4. The light sensor device of claim 1, wherein the window element is formed as an elongate strip, wherein the at least one infrared-light source element includes a plurality of infrared-light source elements arranged distributed along a strip longitudinal direction of the window element, wherein the at least one photodetector element includes a plurality of photodetector elements arranged distributed along the strip longitudinal direction, and wherein the at least one visible-light source element includes a plurality of visible-light source elements arranged distributed along the strip longitudinal direction.

5. The light sensor device of claim 4, wherein the plurality of infrared-sensitive photodetector elements are arranged along the strip longitudinal direction of the window element in interleaved distribution with the plurality of infrared-light source elements.

6. The light sensor device of claim 1, wherein the window element has an opaque or other scattering form, said window element appearing to a user as a luminous operating panel due to the illumination with the visible light from the at least one visible-light source element.

7. The light sensor device of claim 1, wherein a main beam axis of each of the at least one infrared-light source element is oriented substantially parallel or at an acute angle of not more than ±30 degrees or not more than ±20 degrees or not more than ±10 degrees to the first face of circuit board.

8. The light sensor device of claim 7, wherein a main beam axis of each of the at least one visible-light source element is oriented substantially parallel or at an acute angle of not more than ±30 degrees or not more than ±20 degrees or not more than ±10 degrees to the second face of circuit board.

9. The light sensor device of claim 7, further comprising a diaphragm member disposed between the window element and the edge of the circuit board, the diaphragm member projecting beyond the first face of the circuit board, wherein the diaphragm member defines at least one of:

a diaphragm contour in relation to each of the at least one photodetector element for limiting a spatial detection range of the at least one photodetector element; and a diaphragm contour in relation to each of the at least one infrared-light source element for limiting a spatial emission range of the at least one infrared-light source element.

10. The light sensor device of claim 9, wherein the diaphragm member comprises a single diaphragm body formed of infrared-impermeable material and having a diaphragm contour for each of the at least one photodetector element and each of the at least one infrared-light source element.

11. The light sensor device of claim 1, wherein a portion of an outer surface of the window member forms a light deflection face for deflecting, by total reflection, visible light, which has been radiated from the at least one visible-light source element into the window element, towards a region of the window element through which infrared light is radiated from the at least one infrared-light source element.

* * * * *